US006014302A

United States Patent [19]

Batko et al.

[11] Patent Number: 6,014,302

[45] Date of Patent: Jan. 11, 2000

[54] ELECTRIC SHOCK PREVENTION APPARATUS FOR USE WITH A COMPONENT HAVING AN UNINSULATED EXTERIOR SURFACE

[75] Inventors: Thomas J. Batko, Wallingford; Ward E. Strang, Fairfield; Christopher A. Carbone, Newtown, all of Conn.

[73] Assignee: Hubbell Incorporated, Orange, Conn.

[21] Appl. No.: 09/141,590

[22] Filed: Aug. 28, 1998

[51] Int. Cl.[7] .......... H02H 3/00

[52] U.S. Cl. .......... 361/93.9; 361/1; 361/58

[58] Field of Search .......... 361/1, 58, 93.9; 250/338.1, 347; 340/565, 567

[56] References Cited

U.S. PATENT DOCUMENTS

| | | | |
|---|---|---|---|
| 4,158,864 | 6/1979 | Kennon | 361/58 |
| 4,567,538 | 1/1986 | Arimoto et al. | 361/58 |
| 4,604,524 | 8/1986 | Kotlicki et al. | 250/342 |
| 4,982,176 | 1/1991 | Schwarz | 340/567 |
| 5,534,850 | 7/1996 | Lee | 340/565 |

*Primary Examiner*—Michael J. Sherry
*Attorney, Agent, or Firm*—Joseph J. Buczynski; Alfred N. Goodman

[57] ABSTRACT

A finger guard for use with an electronic device is provided for restricting physical access to a component of the electronic device having an uninsulated surface adapted to carry a voltage. The apparatus includes a housing which defines a first opening and which is adapted to mount to the electronic device so that the first opening permits passage of passive infrared energy and ambient light to the component. The apparatus further includes a projection arrangement, extending from the housing, which limits physical access to the surface of the component through the first opening, and defining a second opening through which the infrared energy can enter and pass through the first opening to the component. An electronic circuit can also be provided which limits current being provided to an uninsulated component, such as an infrared or ambient light detector of the electronic device, from a circuit of the electronic device. The apparatus includes a resistive element which couples a terminal of the uninsulated component to ground, and a capacitive element which also couples the terminal of the uninsulated component to ground. The resistive and capacitive elements have resistance and capacitance values, respectively, which limit the current to less than about 500 $\mu$A.

21 Claims, 10 Drawing Sheets

ELECTRIC SHOCK PREVENTION APPARATUS FOR USE WITH A COMPONENT HAVING AN UNINSULATED EXTERIOR SURFACE

BACKGROUND OF THE INVENTION

1. Field of the Invention

The present invention relates to an apparatus and method for preventing electrical shock due to contact with an uninsulated electronic component, such as a passive infrared detector. More particularly, the present invention relates to a mechanical apparatus, such as a finger guard, which restricts physical contact with an uninsulated component, such as infrared detector, carrying a voltage, and an electrical apparatus, such as a current limiting circuit, which limits current supplied to the uninsulated, to prevent electrical shock due to inadvertent or intentional contact with the uninsulated component.

2. Description of the Related Art

A motion sensor switch, such as Model AT277W motion sensor switch manufactured by Hubbell, Inc., includes a passive infrared detector (PIR), and an ambient light detector. Motion sensor switch can be used, for example, as an occupancy detector which shuts off lights after a delay in a room when no one is present in the room, and turns on the lights in the room when a person enters the room. Motion sensor switch also can be used, for example, as a motion sensor for an alarm system.

The motion sensor senses motion in an occupied area, such as an office, conference room in a building, or a home, and in turn controls the lighting loads to save energy. The motion sensor detects a change in the infrared energy radiating from the occupant as the occupant move in and out of or between the PIR lenses sensing lobes. The PIR detector has a pass band in the 8–14 μm infrared range.

If a person enters the monitored area, the person changes the amount of infrared energy being detected by the PIR detector. Therefore, the magnitude of the signal output by PIR detector, which is representative of the amount of detected infrared energy, will change. The detection circuit in the motion detector device processes this signal, and outputs a signal indicating that the amount of infrared energy received by the infrared detector has changed.

The control circuit interprets the signal output by the IR detection circuit, along with the signal provided by ambient light detector. If the signal provided by ambient light detector indicates that the ambient light in the monitored area is low (e.g., very little natural light is present in the monitored area), the control circuit will turn on or increase the brightness of the lights in the monitored area However, if the signal provided by ambient light detector indicates that the ambient light in the monitored area is sufficient (e.g., due to sunlight, etc.), the control circuit may not turn on or brighten the lights, or may only brighten the lights slightly. In either event, control of the lights is based on the signals provided by the infrared detector and ambient light detector.

If a person (occupant) then leaves the monitored area for a period of time exceeding the "off delay", the circuit of the motion sensor turns off the lighting load in the monitored area.

The infrared detector and ambient light detector employed in a motion detector switch of the type described above are non-insulated electronic components which during operation typically carry voltages on at least a portion of their outer casing, or on exposed uninsulated terminals. Because these voltages can create an electrical shock hazard, UL Standards covering uninsulated live parts (i.e., UL773A, effective Aug. 30, 1998) require either that physical access to the infrared detector and ambient light detector be restricted, or that the current provided to infrared detector and ambient light detector be limited to less than 500 μA.

Accordingly, in a motion sensor switch of the type described above, a fresnel lens, which is made of, for example, polyethylene, flexible plastic or any other suitable material, is installed in front of infrared detector and ambient light detector. The lens is most transmissive in the 8–14 μm infrared range, but will also allow visible ambient light (400–700 nm wavelength) to pass. This enables the infrared detector and ambient light detector to receive infrared energy and ambient light, respectively, while also preventing physical contact with the infrared detector and ambient light detector.

Although a lens of the type described above is typically suitable for preventing contact with the infrared detector in the motion detector switch while in place, tampering (e.g., cutting, prying with a tool) with the motion detector switch may result in the lens being removed. Once the lens has been removed, the surfaces of the infrared detector and ambient light detector are exposed and can be contacted by, for example, a person's finger, which could result in the person receiving an electrical shock from the voltage and current being carried by those detectors. Furthermore, the lens is made of a material which will usually melt when exposed to fire. Therefore, due to the required infrared transmissive properties, the lens is not capable of passing a 5-inch flame test required in UL773A.

Although it is possible to provide a flame resistant lens over the infrared energy and ambient light detectors, these type of lenses can be very expensive, and thus not provide a cost effective solution.

Accordingly, a continuing need exists for an apparatus and method which provides added safety in preventing electrical shock due to contact with infrared and ambient light detectors in, for example, a motion detector switch, which does not significantly obstruct the passage of infrared energy and ambient light to the infrared and ambient light detectors, respectively, and which also fully complies with UL773A.

SUMMARY OF THE INVENTION

An object of the present invention is to provide an apparatus which restricts physical access to an uninsulated component, such as an infrared or ambient light detector, in a device, such as a motion detector device, to thus prevent electrical shock due to the voltage and current carried by the uninsulated component, and which fully complies with UL773A.

Another object of the present invention is to provide an apparatus which restricts physical contact with an uninsulated component, such as an infrared or ambient light detector, in a device, such as a motion detector device, while allowing a sufficient amount of infrared energy and light to be received by the uninsulated component to enable the uninsulated component to operate as intended.

A further object of the present invention is to provide an apparatus, such as an electronic circuit, which limits an amount of current provided to an uninsulated component, such as infrared or ambient light detector, in a device, such as a motion detector device, to safeguard against electrical shock to a person contacting the uninsulated component, while enabling the uninsulated component to operate as intended.

These and other objects of the present invention are essentially attained by providing an apparatus, such as a finger guard, for use with an electronic device, for restricting physical access to a component of the electronic device having a surface adapted to carry a voltage. The apparatus includes a housing which defines a first opening therein, and which is adapted to mount to the electronic device so that the first opening permits passage of light to the component. The apparatus further includes a projection arrangement, extending from the housing and defining a second opening which permits infrared energy and light passing therethrough to pass through the first opening to the component, while also limiting physical access to the surface of the component through the first opening.

The projection arrangement can include a plurality of projection which are disposed at intervals about the first opening, and which each include a first projection portion which extends away from the housing and a second projection portion which extends transversely of the extension direction of the first projection portion. The edges of the second projection portion of each projection falls substantially within a periphery defining the second opening.

The above objects, along with other objects, are also essentially achieved by providing an apparatus, for use with an electronic device, for limiting current being provided to an uninsulated component, such as a infrared detector of the electronic device, from a circuit of the electronic device. The apparatus includes a resistive element which couples a terminal of the uninsulated component to ground, and a capacitive element which also couples the terminal of the uninsulated component to ground. The resistive and capacitive elements have resistance and capacitance values, respectively, which limit the current to less than about 500 $\mu$A. The capacitive element comprises a plurality of capacitors which are coupled in series. Therefore, if one of the capacitors becomes short-circuited, the remaining capacitor or capacitors provide a capacitive sufficient to enable the apparatus to limit the current being provided to the uninsulated component to less than about 500 $\mu$A.

Other objects, advantages and salient features of the invention will become more apparent from the following detailed description, which taken in conjunction with the annexed drawings, discloses preferred embodiments of the invention.

BRIEF DESCRIPTION OF THE DRAWINGS

Referring now to the attached drawings which form a part of the original disclosure.

DETAILED DESCRIPTION OF THE PREFERRED EMBODIMENTS

Figure 1:
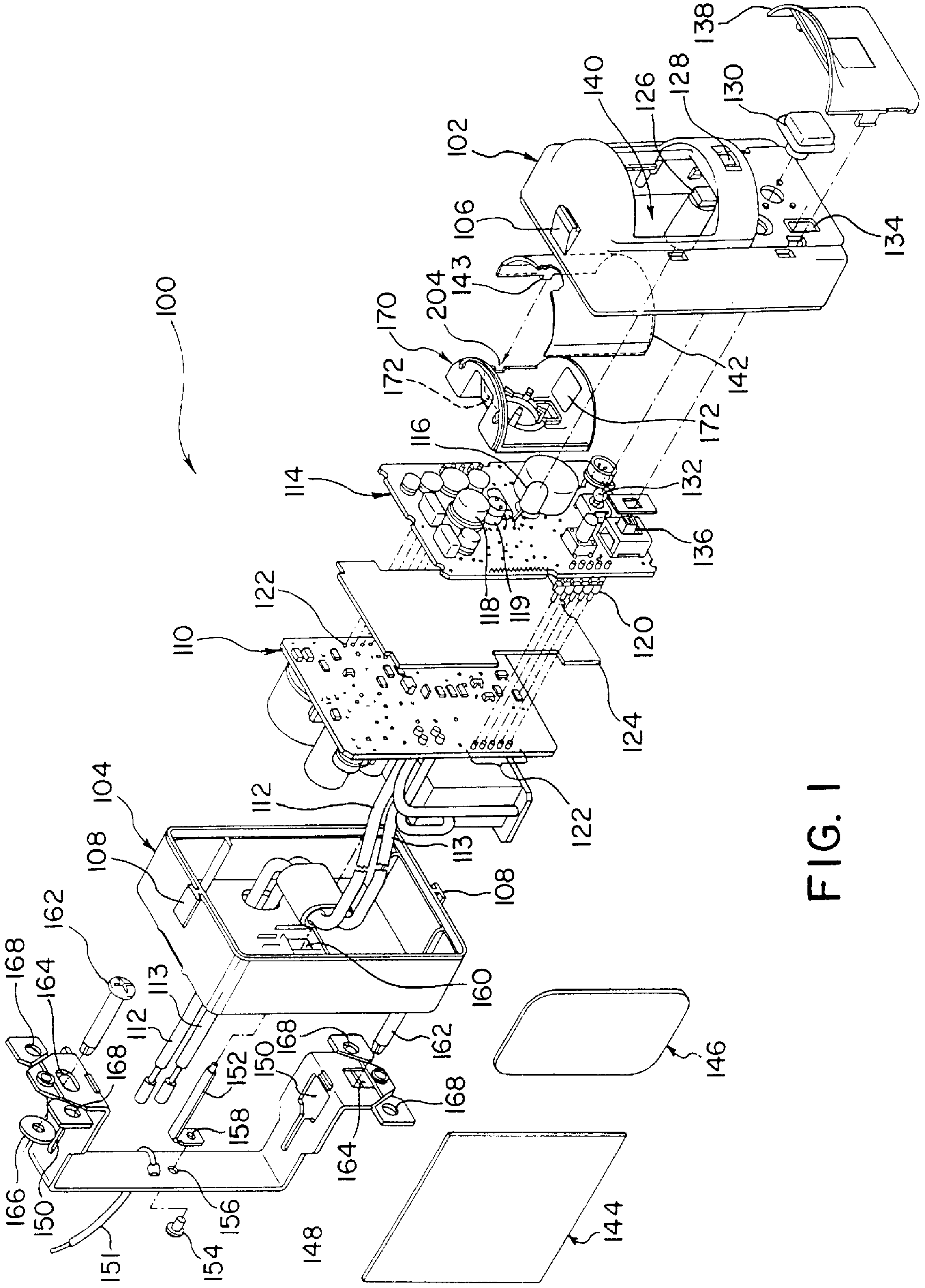
FIG. 1 is an exploded perspective view of a motion detector device employing a finger guard according to an embodiment of the present invention.
Figure 2:
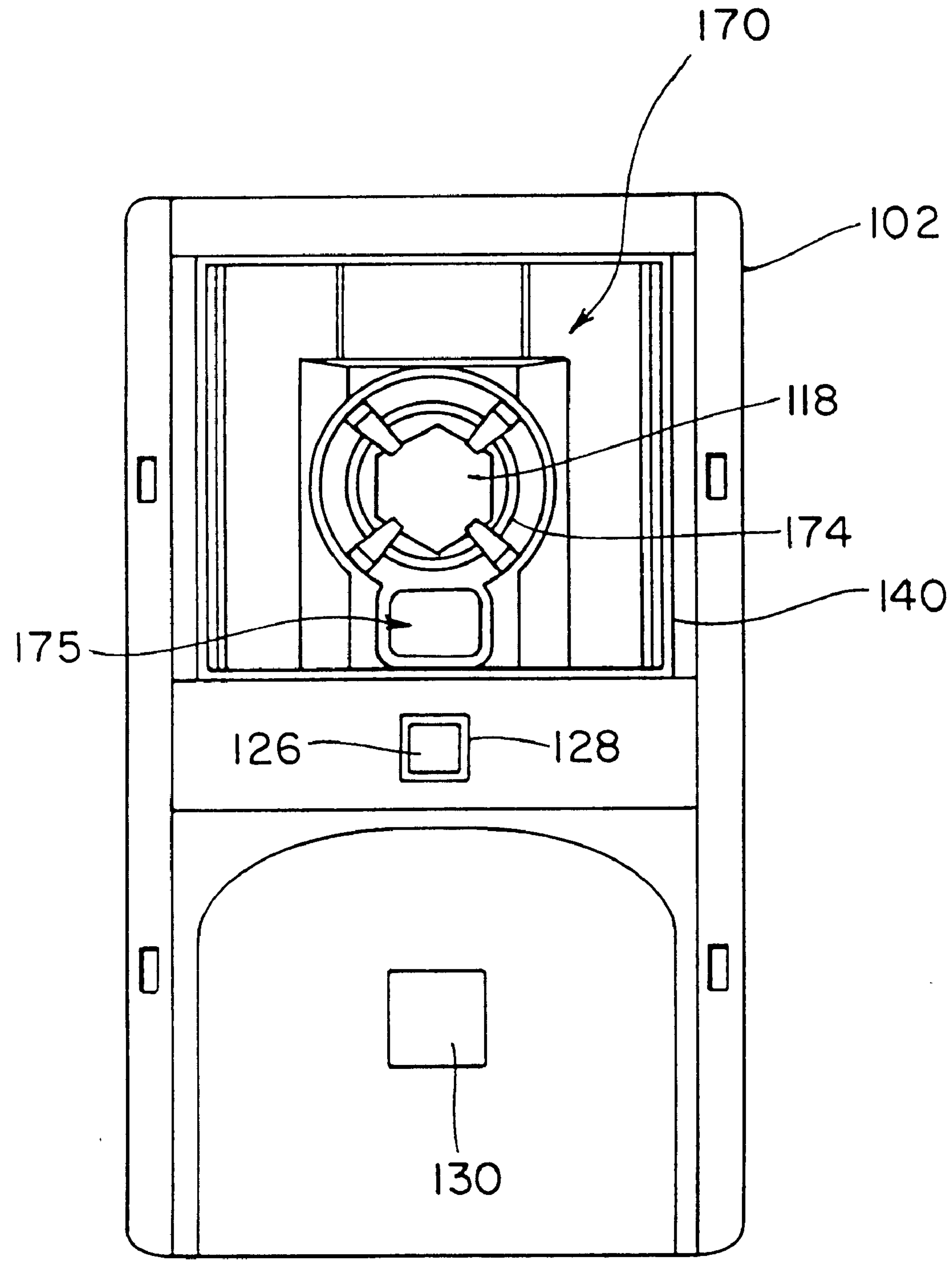
FIG. 2 is an enlarged front view of the motion detector device shown in FIG. 1, with the lens being removed to expose the finger guard.
Figure 3:
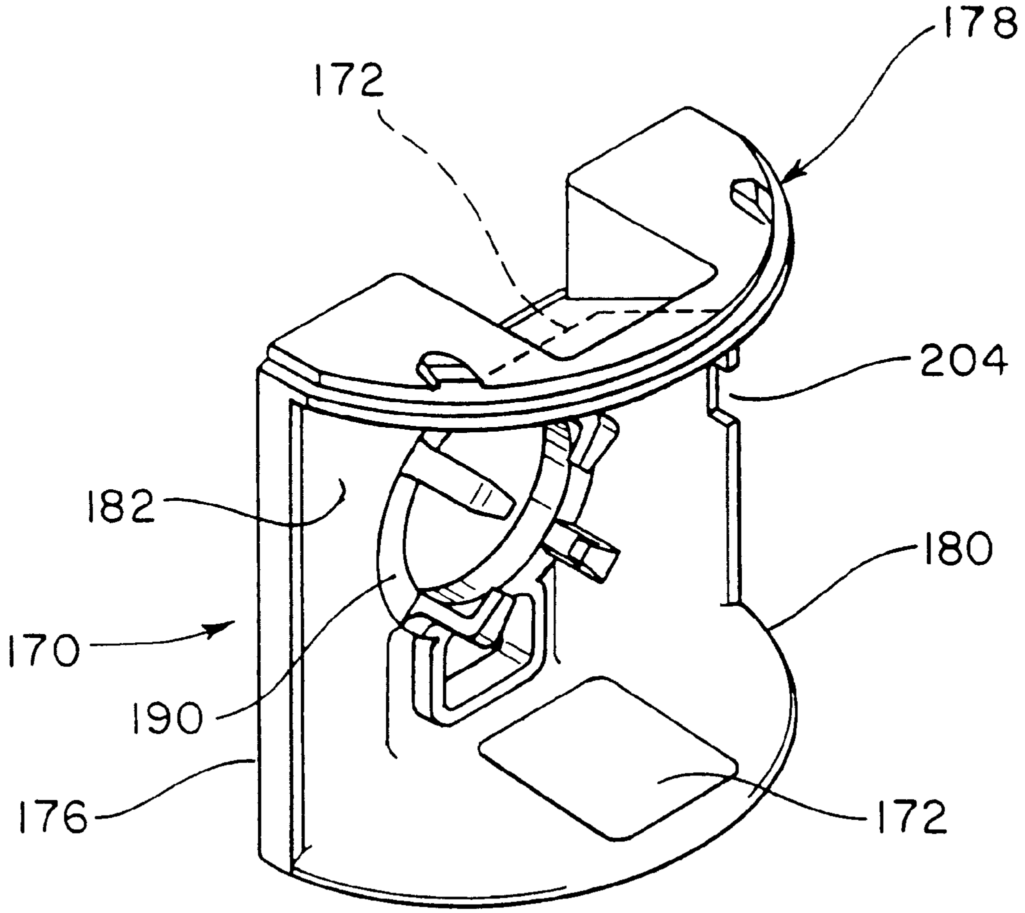
FIG. 3 is an enlarged prospective view of the finger guard show in FIGS. 1 and 2.
Figure 4:
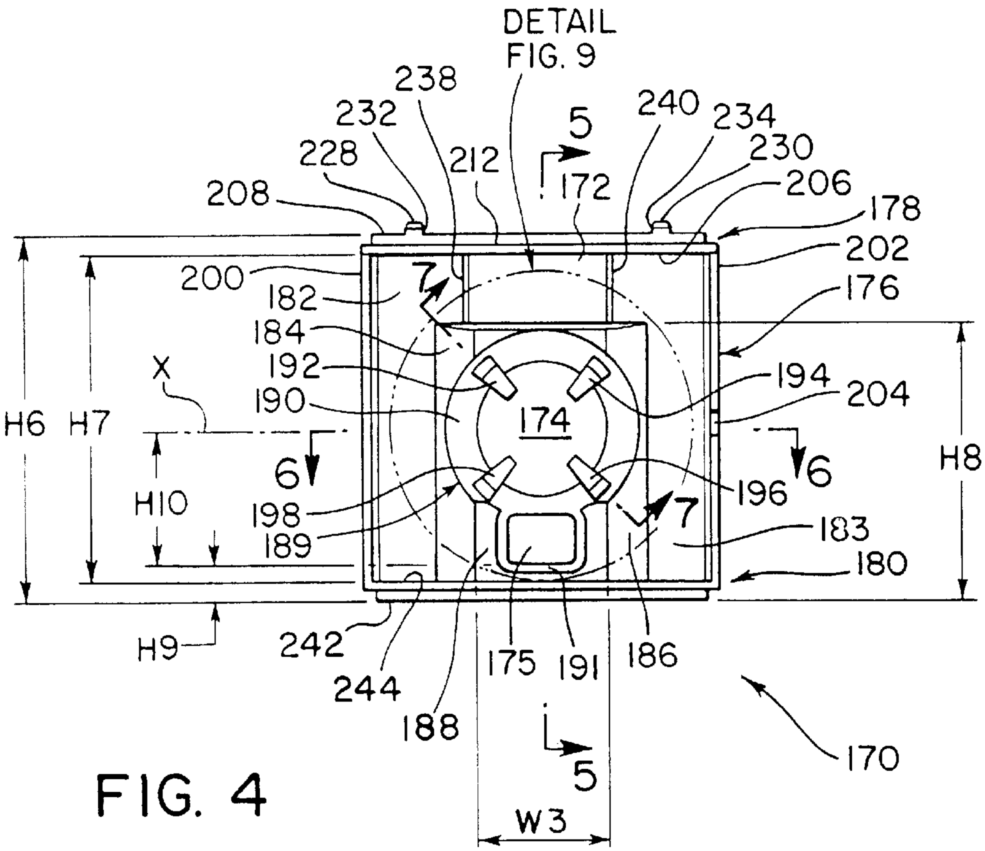
FIG. 4 is a front view of the finger guard shown in FIGS. 1–3.
Figure 5:
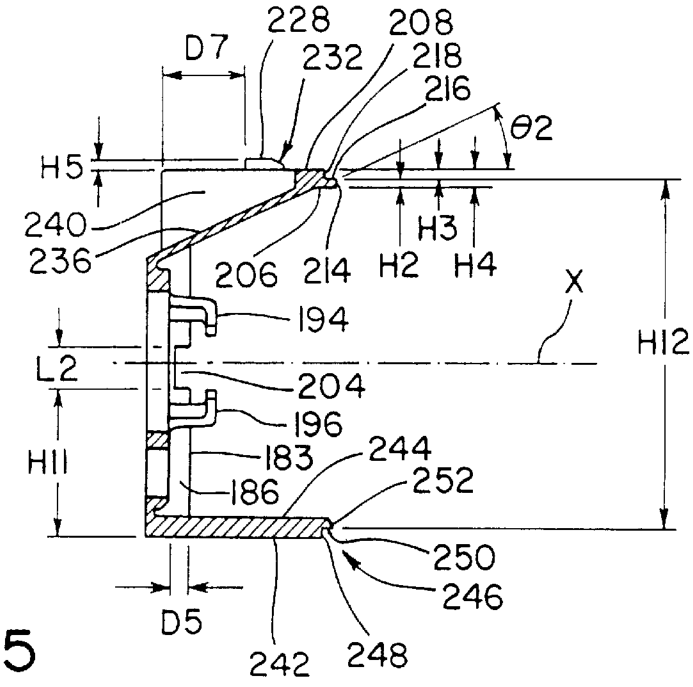
FIG. 5 is a cross-sectional view of the finger guard taken along lines 5—5 in FIG. 4.

A motion detector 100, in which a finger guard according to an embodiment of the present invention is employed, is illustrated in FIGS. 1 and 2. Motion detector 100 can be, for example, model AT277W motion detector switch manufactured by Hubbell, Inc., or any other suitable motion detector.

Motion detector 100 includes a front housing 102 and a rear housing 104, which are each made of a plastic, composite, or any other suitable material, and interlock with each other to form the housing of motion detector 100. Specifically, front housing 102 includes latch members 106 on its top and bottom which receive locking tabs 108 on the top and bottom of rear housing 104 to releasable lock the front and rear housings 102 and 104 together.

Motion detector 100 further includes a circuit assembly comprising a power supply circuit board 110 having a wire 112 coupled thereto which connects to an AC power source (not shown) to provide power to the power supply circuit 110. Power supply circuit board 110 also has a wire 113 coupled thereto which is used to provide an output of the motion detector 100 to, for example, control a lighting circuit.

Motion detector 100 further includes a printed circuit board assembly 114 including components, such as motion indicator LED 116, infrared detector 118, and ambient light detector 119, the purposes of which are described in more detail below. Circuit board assembly 114 further includes connectors 120 which plug into the PCB 122 of power supply circuit board 110 to enable circuit board assembly 114 to receive power from power supply circuit board 110. An insulator 124 is positioned between power supply circuit 110 and circuit board assembly 114 to prevent unintentional contact between components on power supply circuit board 110 and circuit board assembly 114.

Motion detector 100 also includes a light pipe 126 which is positioned over LED 116 to direct light from LED 116 through an opening 128 in front housing 102. A button 130 is positioned on the front of front housing 102, and is mechanically connected to override push button 132 on circuit board assembly 114. Front housing 102 further includes a switch opening 134 which provides access to off/auto switch 136 on circuit board assembly 114. A door 138 is removably attached to front housing 102 to cover off/auto switch 136, and thus permits access to off/auto switch 136 only when removed.

Front housing 102 also includes a window 140 therein, which allows passage of infrared energy and light to infrared detector 118 and ambient light detector 119, as is described in more detail below. A lens 142, which is made, for example, of a flexible plastic material and is essentially transparent to infrared energy and usable for ambient visible light, is mounted in window 140. When lens 142 is mounted in window 140, lens 142 prevents physical access to components, such as infrared detector 118 and ambient light detector 119, on circuit board assembly 114. Lens 142 includes tabs 143, the purpose of which is described below.

Motion detector 110 can also include a label 144, which is attached to wires 112 and 113, for example, and includes information pertaining to the wiring attachment Motion detector 110 can further include a label 146, which is attached to external portions of front and rear housings 102 and 104, and includes information, such part number, UL rating criteria, and the like.

Motion detector 100 also includes a bracket assembly 148 having openings 150 therein, which receive locking tabs 108 of rear housing 104 and latch members 106 of front housing 102, to mount bracket assembly 148 to the assembled front and rear housings 102 and 104. Bracket assembly 148 further includes a ground wire 151, which can be coupled to ground or, for example, to a grounded terminal of power supply (not shown) which provides power to power supply circuit board 110 as described above. A metal pin assembly 152 is mounted to bracket assembly 148 by a screw 154, whose shaft passes through opening 156 in bracket assembly 148 and into opening 158 in pin assembly 152. Pin assembly 152 passes through opening 160 in rear housing 104, and engages with a slot (not shown) in power supply circuit board 110 to provide an electrical connection between power supply circuit board 110 and ground wire 151.

Bracket assembly 148 further includes screws 162 which pass through openings 164 in bracket assembly 148 to mount bracket assembly and hence, motion detector 100, in an electrical box, for example. Washers 166 can be used in conjunction with screws 162 to mount the bracket to the electrical box. Bracket assembly 148 also includes additional openings 168, which can receive additional screws, rivets, or any other suitable structure to motion detector 100 to the support surface.

As described above, a finger guard 170 according to an embodiment of the present invention is employed motion detector 100 as shown. Finger guard 170 is an integral, one-piece unit made, for example, of a hard or relatively hard plastic or composite material, or any other suitable material as required by UL773A Standards cited above. Finger guard 170 also can include warning labels 172, which provide information pertaining to a potential hazard created by infrared detector 118 and ambient light detector 119 as described in more detail below.

As shown in FIG. 2, in particular, finger guard 170 is positioned between circuit board assembly 114 and front housing 102, so that finger guard 170 aligns with or essentially aligns with window 140 in front housing 102. When lens 142 is mounted in window 140, lens 142 covers the front of finger guard 170. For illustrative purposes, however, FIG. 2 shows the motion detector 100 with lens 142 being removed to expose finger guard 170.

As further shown in FIG. 2, and as described in more detail below, finger guard 170 includes a circular or substantially circular opening 174 which aligns with infrared detector 118 when finger guard 170 is mounted in motion detector 100. Finger guard 170 also includes a substantially rectangular shaped opening 175 which aligns with ambient light detector 119 when finger guard 170 is mounted in motion detector 100. Hence, as described in more detail below, infrared energy and ambient light entering window 140 of front housing 102 passes through openings 174 and 175 in finger guard 170 and are detected by infrared detector 118 and ambient light detector 119, respectively.

Figure 6:
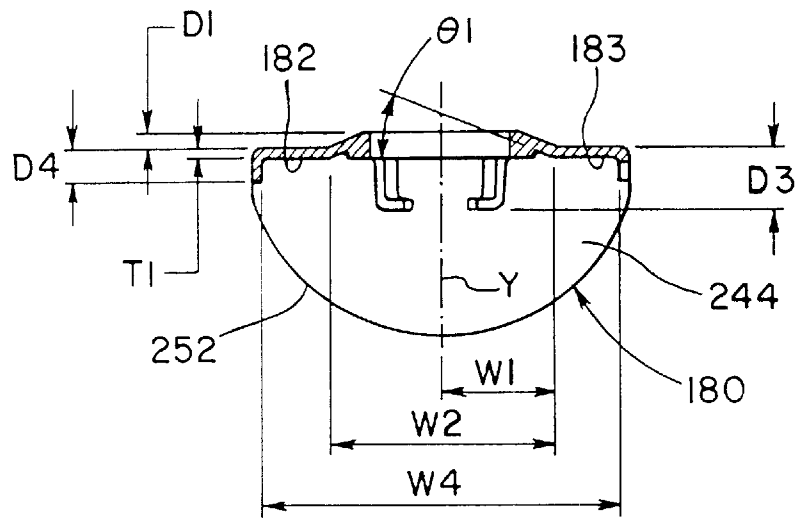
FIG. 6 is a cross-section view of the finger guard taken along lines 6—6 in FIG. 4.

Finger guard 170 is shown in more detail in FIGS. 3–9. Finger guard 170 includes a vertical wall portion 176, a top wall portion 178 and a bottom wall portion 180 which are integral with each other. Vertical wall portion 176 has a planar or substantially planar portions 182 and 183, slanted portions 184 and 186, and a recessed planar or substantially planar portion 188 which extends parallel or substantially parallel to planar portions 182 and 183. Planar portions 182 and 183 each has a thickness T1 of about 0.025 inches. Slanted portions 184 and 186 each extend at an angle θ1 with respect to their respective planar portion 182 and 183, respectively, and each has a width D1 measured from a central vertical plane Y which, as shown in FIG. 6, extends through the center of finger guard 170. In this example, θ1 is about 20°, and width W1 is about 0.320 inches. The combined width W2 of slanted portions 184 and 186 in this example is therefore about 0.640 inches.

Recessed planar portion 188 is divided by vertical plane Y into two halves having essentially equal widths, with the overall width W3 of recessed planar portion 188 in this example being about 0.400 inches. The rear surface of recessed planar portion 188 is recessed at a distance D1 from the rear surfaces of planar portions 182 and 183. In this example, distance D1 is about 0.044 inches.

A raised portion 189 extends outward from slanted portions 184 and 186 and recessed planar portion 188. Raised portion 189 includes a circular or substantially circular portion 190 which encircles opening 174 in finger guard 170, and a substantially rectangular-shaped portion 191 which encircles second opening 175 in finger guard 170. In this example, circular portion 190 has a diameter of about 0.530 inches, and opening 174 has a diameter of about 0.400 inches, which is sufficient to accommodate infrared detector 118 such that none of circular portion 190 obstructs the front surface of infrared detector 118. Circular portion 190 therefore has a thickness of about 0.130 inches. Also in this example, opening 175 has a length L1 of about 0.215 inches, with each lengthwise edge of rectangular-shaped portion 191 having about a 5° draft (see FIG. 9, in particular), and has a height H1 of about 0.160 inches with each heightwise edge of rectangular-shaped portion 191 having about a 5° draft. In this example, rectangular-shaped portion 191 has a thickness of about 0.030 inches, with each of the four comers of rectangular-shaped portion 191 being rounded to have an inner radius of about 0.030 inches.

Finger guard 170 further includes projection portions 192, 194, 196 and 198 which each extend outwardly from raised portion 190 to a distance D2 from the rear surface of recessed planar portion 188, a distance D3 from the rear surfaces of planar portions 182 and 183, and at an angle of about 2° with respect to vertical plane Y. In this example, distance D2 is about 0.215 inches, and distance D3 is about 0.171 inches. Further details of projection portions 192, 194, 196 and 198, and their purpose, are described below.

Vertical wall portion 170 further includes vertical edge portions 200 and 202 which extend outward from opposite side edges of planar portions 182 and 183, respectively, in a direction normal or substantially normal to planar portions 182 and 183 at a distance D4 from the rear surface of planar portions 182 and 183, respectively. In this example, distance D4 is about 0.090 inches. The width W4 of finger guard 170 taken between the inner surfaces of vertical edge portions 200 and 202 is about 1.030 inches in this example.

Vertical edge portion 202 includes a notch 204 therein having a depth D5 and a length L2, which functions as a locating notch to position finger guard 170 correctly with respect to lens 142 of motion detector 100. In this example, depth D5 is about 0.045 inches and length L2 is about 0.120 inches. As shown in FIG. 1, notch 204 receives tab 143 of lens 142 and thus maintains finger guard 170 at a predetermined position with regard to lens 142.

Top portion 178 of finger guard 170 includes a lower planar or substantially planar portion 206, and an upper planar or substantially planar portion 208 which is parallel or substantially parallel to lower planar portion 206. Top portion 178 further includes a step-edge portion 212 which include an outer edge surface 214, a step surface 216, and an inner edge surface 218. Step edge portion 212 receives a ridge (not shown) along the top inner surface of lens 142 to assist in securing finger guard 170 to the lens 142 during assembly.

Outer edge surface 214 extends normal or substantially normal to lower planar portion 206 and is integral with step surface 216 which extends normal or substantially normal to outer edge surface 214 and thus parallel or substantially parallel to lower planar portion 206 and upper planar portion 208. Inner edge surface 218 extends between an edge of upper planar portion 208 and an edge of steps surface 216 normal or substantially normal to step surface 216 and upper planar portion 208.

In this example, outer edge surface 214 extends for a height H2 which, in this example, is about 0.030 inches, and inner edge surface 218 extends for a height H3 which, in this example, is about 0.030 inches. Accordingly, the overall height H4 between lower planar portion 206 and upper planar portion 208 is about 0.060 inches in this example.

Figure 8:
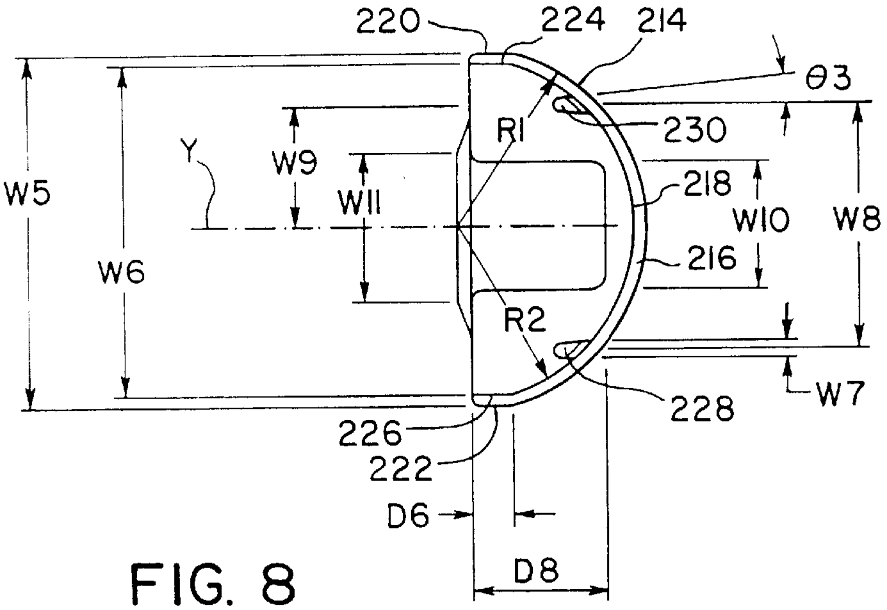
FIG. 8 is a top view of the finger guard shown in FIG. 4.

Furthermore, as shown in FIG. 8, in particular, outer edge surface 214 extends arcuately at a radius R1 which, in this example, is about 0.565 inches, and inner edge surface 218 extends arcuately at a radius R2 which, in this example, is about 0.531. Accordingly, lower planar portion 206 and upper planar portion 208 each have a semi-circular or substantially semi-circular shape.

However, as further shown in FIG. 8, outer edge surface 214 includes straight or substantially straight portions 220 and 222, and inner edge surface 218 includes straight or substantially straight portions 224 and 226. Straight portions 220–226 each extend normal or substantially normal to vertical wall portion 176 at a distance D6 from the rear surface of planar portions 182 and 183. In this example, D6 is about 0.130 inches.

Finger guard 170 therefore has an overall width W5 of about 1.080 in this example as measured between the outer surfaces of straight portions 220 and 222. Width W6 measured between inner surfaces of straight portions 220 and 222 is about 1.010 in this example.

Top portion 178 further includes projections 228 and 230 which each extend from upper planar portion 208 in a direction normal or substantially normal to upper planar portion 208 to a height H5 which is about 0.030 inches in this example. Projection 228 has a chamfered end 232, and projection 230 has a chamfered end 234. Chamfered ends 232 and 234 each extend at an angle of about 30° with respect to upper planar portion 208 and thus, at an angle of about 30° with respect to the top surfaces of projections 228 and 230. Projections 228 and 230 each extend backward along upper planar portion 208 from inner edge surface 218 to a distance D7 from the back surface of respective planar portions 182 and 183. In this example, distance D7 is about 0.250 inches.

Projections 228 and 230 each have a width W7 which, in this example, is about 0.050 inches. Outer sides of projections 228 and 230 each extend at an angle θ2 of about 5° with reference to respective planes which are parallel to vertical plane Y. The centers of projections 228 and 230 are spaced at a width W8 which, in this example, is about 0.750 inches, and are thus each at a distance W9 of about 0.375 inches from vertical plane Y.

Top portion 178 further includes a slanted portion 236 which extends at an angle θ3 with respect to upper planar portion 208. In this example, θ3 is an angle of about 26°. Vertical sections 238 and 240 extend downward in a direction normal or substantially normal to lower planar portion 206 to slanted portion 236 as shown. As further illustrated, label 172 is attached to the inner surface of slanted portion 236. Slanted portion 236 has a width W10 which, in this example, is about 0.393 inches, and extends from the rear surfaces of planar portions 182 and 183 for a distance D8 which, in this example, is about 0.400 inches taken along vertical plane Y. As further shown, the width W11 of rear surface of recessed planar portion 188 is about 0.450 in this example, which is slightly greater than the width W10 of slanted portion 236.

Bottom portion 180 includes a lower planar portion 242 and an upper planar portion 244 which extends parallel or substantially parallel to lower planar portion 242. Bottom portion 180 further includes a step-edge portion 246 which includes an inner edge surface 248, a step surface 250, and an outer edge surface 252. Step-edge portion 246 receives a ledge (not shown) which extends along the bottom inner surface of lens 142 to assist in securing finger guard 170 to the lens 142 during assembly.

Inner edge surface 248 extends upward from lower planar portion 242 in a direction normal or substantially normal to lower planar portion 242. Step surface 250 extends from inner edge surface 248 in a direction normal or substantially normal to inner edge surface 248, and outer edge surface 252 extends between step surface 250 and upper planar portion 244 and is curved at a radius of about 0.020 inches. Inner edge surface 248 extends arcuately at the radius R2 described above, while outer edge surface 252 extends arcuately at the radius R1 described above.

In this example, finger guard 170 also has the following dimensions.

A height H6 of finger guard 170 taken between lower planar portion 242 and upper planar portion 208 in this example is about 1.092 inches. A height H7 taken between upper planar portion 244 and lower planar portion 206 in this example is about 0.977 inches. A height H8 taken between lower planar portion 242 and the lower edge of slanted portion 236 in this example is about 0.820 inches. This height H8 is also essentially equal to the height of slanted portions 184 and 186 as taken from lower planar portion 242.

A height H9 taken from lower planar portion 242 to the bottom edge of second opening 175 in this example is about 0.108 inches, and a height H10 taken from the bottom edge of second opening 175 to horizontal plane X, which passes through the center of opening 174, is about 0.403 inches in this example. Height H11 between lower planar portion 242 and the bottom edge of notch 204 in this example is about 0.440 inches. Height H12 between step surface 250 and step surface 216 in this example is about 1.030 inches.

Figure 7:
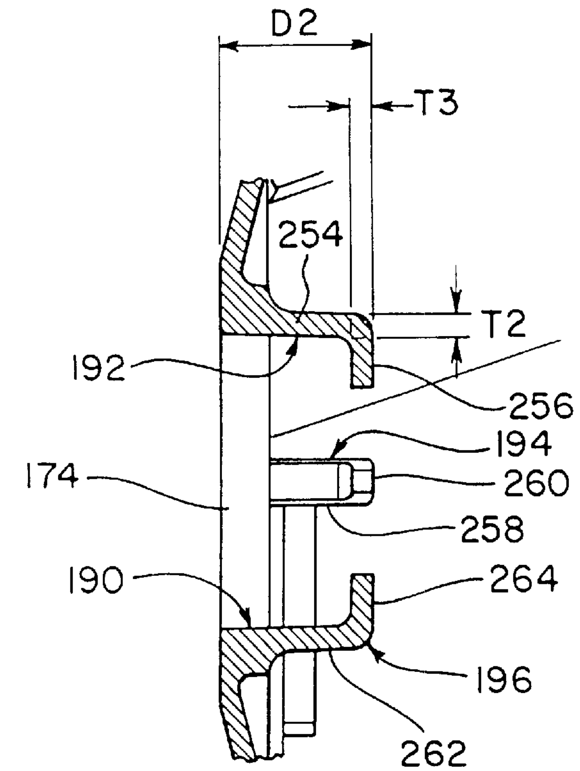
FIG. 7 is a cross-sectional view of the finger guard taken along lines 7—7 in FIG. 4.
Figure 9:
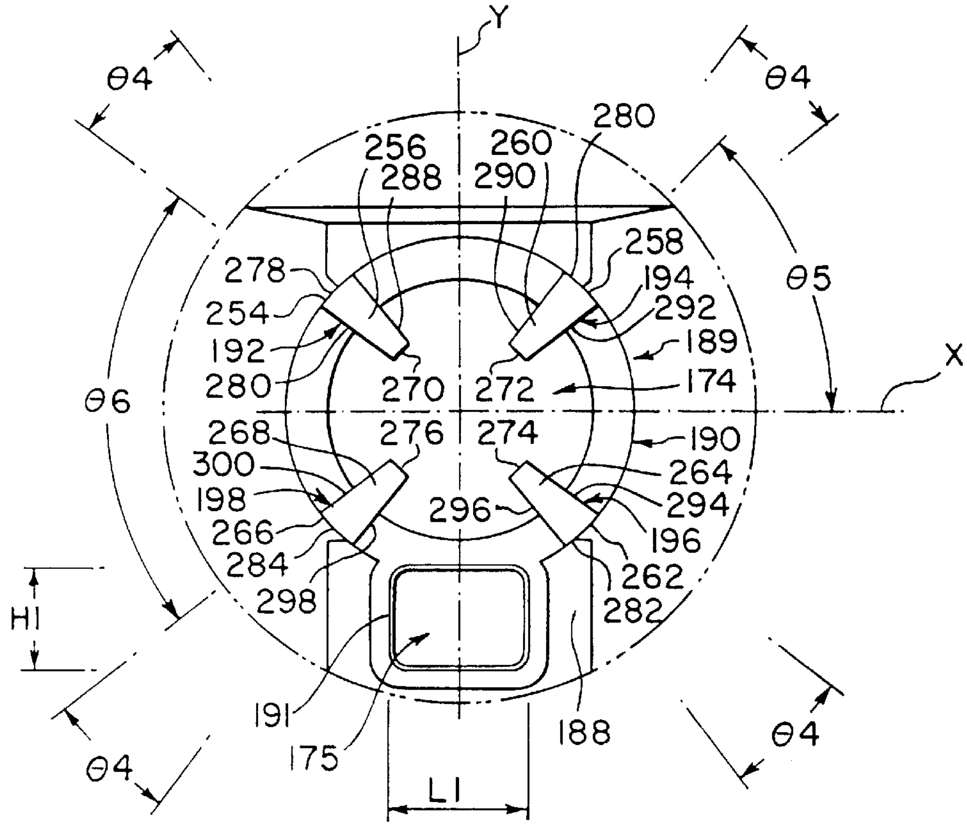
FIG. 9 is an enlarged detail view of the opening and projections of the finger guard shown in FIG. 4.
Figure 10:
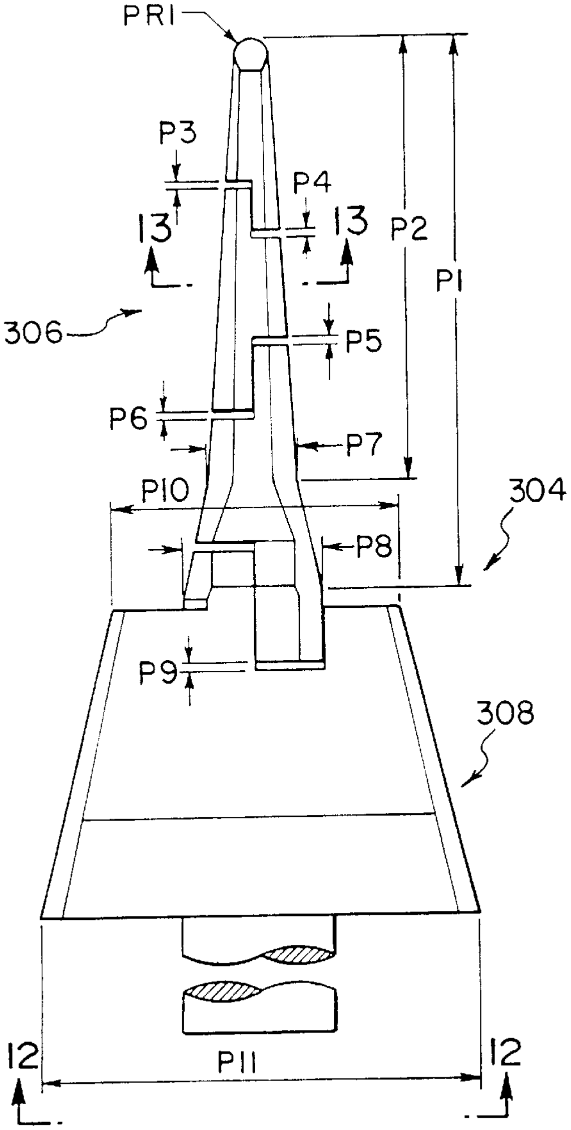
FIG. 10 is a schematic front view of an articulate probe according to UL guidelines UL773A, which is used to determine whether the finger guard shown in FIG. 4 sufficiently limits access to the infrared detector and ambient light detector of the motion sensor device shown in FIGS. 1 and 2.
Figure 11:
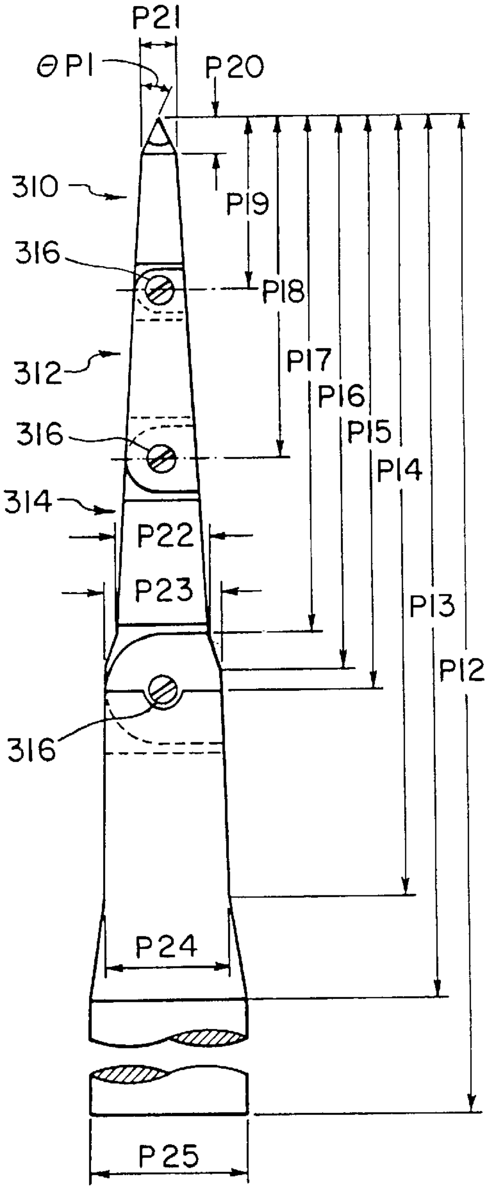
FIG. 11 is a side view of the probe shown in FIG. 10.
Figure 12:
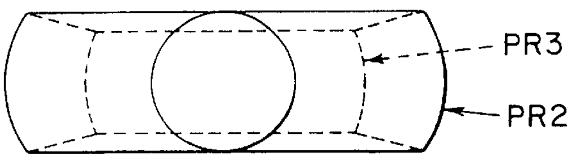
FIG. 12 is a plan view of the proximal end of the probe taken in the direction of lines 12—12 in FIG. 10.
Figure 13:
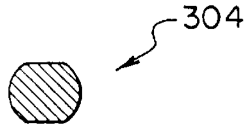
FIG. 13 is a cross-sectional view of the probe taken along lines 13—13 in FIG. 10.

Details of projection portions 192, 194, 196 and 198 will now be described As shown explicitly in FIGS. 7 and 9, projection portion 192 includes a first portion 254 and a second portion 256. As discussed above, projection portion 192 extends at a draft angle of about 2° with respect to vertical plane Y. Hence, first portion 254 extends outward from raised portion 190 at that draft angle, and thus, substantially normal to the upper surface of raised portion 190. Projection portion 194 includes a first portion 258 and a second portion 260 which are similar or identical in size and construction to first and second portions 254 and 256, respectively. Projection portion 196 includes first portion 262 and second portion 264 which are similar in size of construction to first portion 254 and second portion 256, respectively. Projection portion 198 includes first portion 266 and second portion 268 which are similar in size and construction to first portion 254 and second 256.

Each first portion 254, 258, 262, and 266 has a thickness T2 of about 0.031 inches, and each second portion 256, 260, 264, and 268 has a thickness T3 of about 0.030 inches. As shown in FIG. 9, second portions 256, 260, 264, and 268 extend radially from inner edges 270, 272, 274, and 276, respectively, to outer edges 278, 280, 282, and 284 respectively, such that sides 286 and 288 of second portion 256 extend at an angle θ4 with respect to each other, sides 290 and 292 of second portion 260 extend at angle θ4 with respect to each other, sides 294 and 296 of second portion 264 extend at angle θ4 with respect to each other, and sides 298 and 300 of second portion 268 extend at angle θ4 with respect to each other as shown. In this example θ4 has a value of about 15°. Inner edges 270, 272, 274, and 276 each lie in or substantially in as perimeter of a circle defined by inner edges 270, 272, 274, and 276, which in this example has a diameter of about 0.255 inches and lies within a plane parallel or substantially parallel to a plane in which opening 174 is formed. The thickness of each second portion 256, 260, 264 and 268 taken along their respective inner edges 270, 272, 274 and 276 is about 0.034 inches in this example.

As further shown in this example, the centers of second portions 256, 260, 264, and 268 each are at an angle θ5 with respect to horizontal plane H. In this example, θ5 is about 45°. Also, adjacent sides of adjacent second portions are angled at an angle θ6 with respect to each other which, in this example, is about 75°.

It is noted that although specific dimensions, angles and radii have been discussed above for finger guard 170, the components of finger guard 170 discussed above can have any suitable dimensions, angles and radii which enable finger guard 170 to achieve the purpose discussed below.

Specifically, as explained above, finger guard 170 functions to permit infrared energy to be received by infrared detector 118, and to permit ambient light to be received by ambient light detector 119, while restricting physical contact with infrared detector 118 and ambient light detector 119. In particular, the positions and dimensions of projection portions 192–198 are such that projection portions 192–198 prevent, for example, a person's finger from contacting infrared detector 118, while allowing a sufficient amount of infrared energy to pass through opening 174 to be detected by infrared detector 118 so that the sensitivity of motion sensor 100 is not significantly diminished. Similarly, rectangular-shaped portion 191 of finger guard 170 which surrounds ambient light detector 119 prevents, for example, a person's finger from contacting ambient light detector 119, while allowing a sufficient amount of ambient light to pass through opening 175 to be detected by ambient light detector 119 so that the sensitivity of motion sensor 100 is not significantly diminished.

As explained above, the finger guard 170 and, in particular, projection portions 192–198 and rectangular-shaped portion 191 have dimensions which restrict physical contact with infrared detector 118 and ambient light detector 119 to a degree necessary to comply with UL773A Standards discussed above. The finger guard 170 therefore must prevent an articulate probe having dimensions in accordance with FIG. 4.1 of UL773A from contacting infrared detector 118 and ambient light detector 119 when finger guard 170 is positioned in motion detector 100. The dimensions and positioning of projection portions 192, 194, 196 and 198 are such that projection portions 192, 194, 196 and 198 sufficiently prevent contact with infrared detector 118 to comply with UL773A, while only minimally blocking passage of infrared energy into opening 174 at certain angles.

An example of an articulate probe 304 having dimensions in accordance with UL773A is shown in FIGS. 10–13. In particular, articulate probe 304 has a tip portion 306 and a base portion 308. Articulate probe 304 has the dimensions P1–P25 which are as follows:

P1=97.0 mm; P2=78.0 mm; P3=0.05 mm; P4=0.05 mm; P5=0.05 mm; P6=0.05 mm; P7=16.0 mm; P8=25.4 mm; P9=0.05 mm; P10=50.0 mm; P11=78.0 mm; P12=234.0 mm; P13=154.0 mm; P14=136.0 mm; P15=100.0 mm; P16=96.0 mm; P17=90.0 mm; P18=60.0 mm; P19=30.0 mm; P20=5.0 mm; P21=5.8 mm; P22=15.0 mm; P23=19.0 mm; P24=21.5 mm; and P25=25.4 mm.

Also, the distal tip of tip portion 306 has a radius PR1 of about 3.5 mm, and base portion 308 has radius PR2 and PR3 each of about 25 mm. Also, the distal end of tip portion 306 is slanted at an angle θP1 of about 30° as shown. As further indicated, tip portion 306 includes a first section 310, a second section 312 and a third section 314 which are pivotally coupled together by screws 316.

Figure 14:
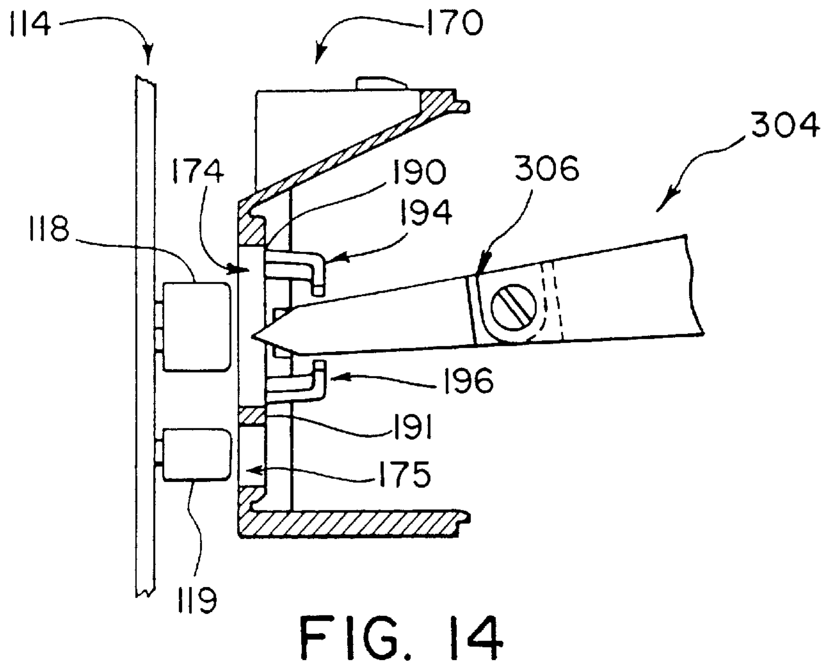
FIG. 14 shows a cross-sectional view of the finger guard shown in FIGS. 3–9 in relation to the distal end of articulate probe shown in FIGS. 10–13.

As shown in FIG. 14, the orientation and dimensions of projections 192–198 prevent the distal end of tip portion 306 from contacting infrared detector 118 when finger guard 170 is positioned motioned detector 100. The projection portions 192–196 prevent the distal end of tip portion 306 of articulate probe 304 from contacting infrared detector 118 regardless of the angle at which tip portion is attempting to end opening 174. Also, rectangular-shaped portion 191 prevents the distal end of tip portion 306 from contacting ambient light detector 119. Accordingly, finger guard 170 fully complies with the guidelines set forth in UL 773 A.

Although finger guard 170 is shown as having four projection portions, finger guard 170 can be configured to include any number of projection portions which will enable finger guard 170 to remain in compliance with UL 773 A. It is also preferable that the projection portions be narrow so that they obstruct only a small fraction of infrared energy propagating toward opening 174, and thus do not significantly diminish the sensitivity of motion detector 100. Also, the projections need not be spaced circularly about opening 174, but can have any suitable spacing arrangement.

Specifically, the projection portions 192–198 are positioned to minimize the obstruction of infrared energy, or any other spectral energy (e.g., visible light, and so on), propagating to infrared detector 118, so that no attenuation of passive infrared energy or visible light occurs along a horizontal axis extending normal to the surface of infrared detector 118, and the umbra of the lenses of the infrared detector 118 is minimized. Projection portions 192–198 positioned as exemplified above essentially align with a segment to segment joining area in the lens of the infrared detector 118 where minimal gain occurs. Any attenuation that may be caused by projection portions 192–198 occurs for infrared energy propagating toward infrared detector 118 at angles with respect to the horizontal axis which would result in the path of the infrared energy intersecting any of the projection portions 192–198.

Figure 15:
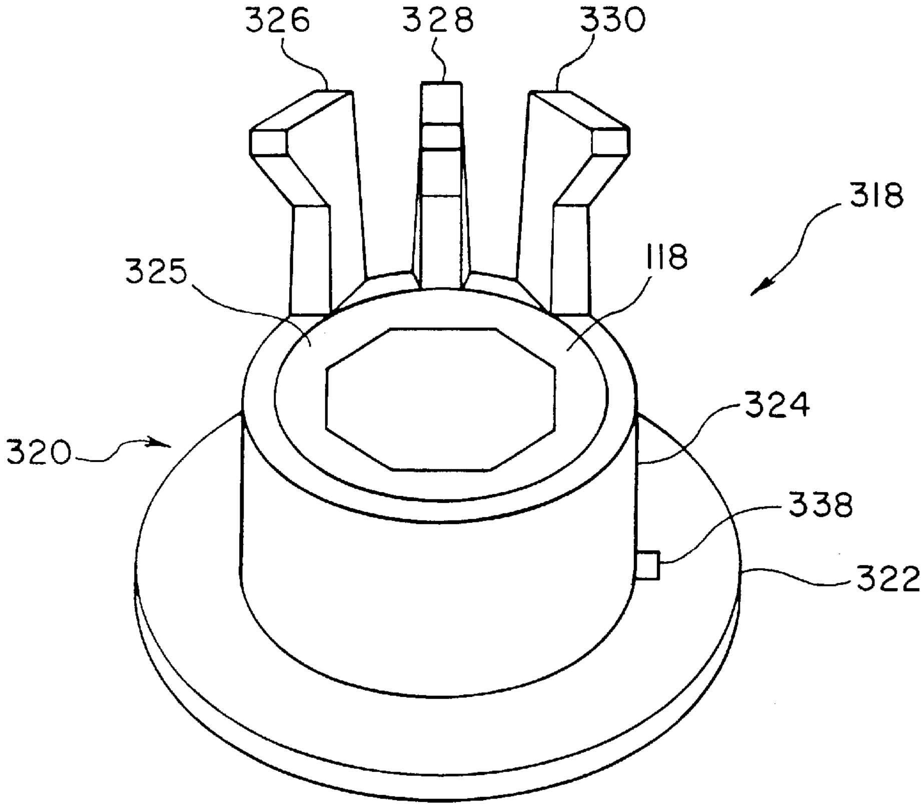
FIG. 15 is a perspective view of a finger guard according to another embodiment of the present invention.
Figure 16:
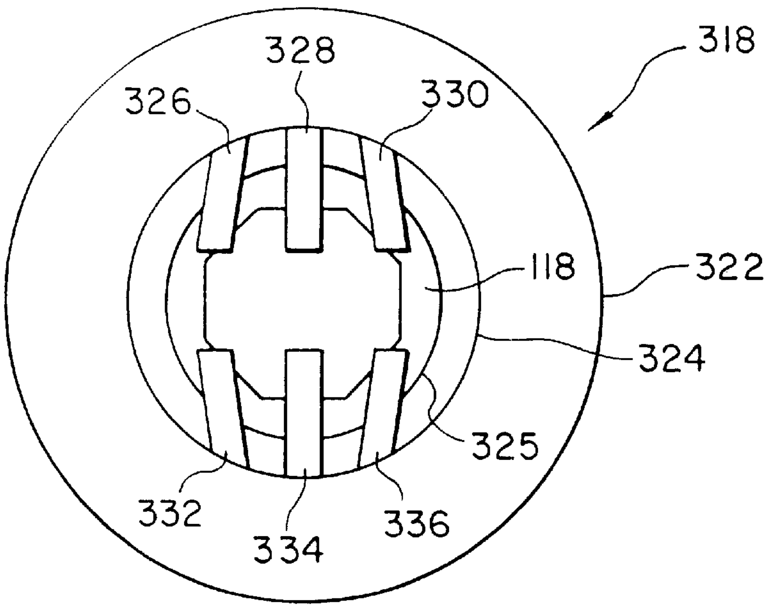
FIG. 16 is a top plan view of the finger guard shown in FIG. 15.
Figure 17:
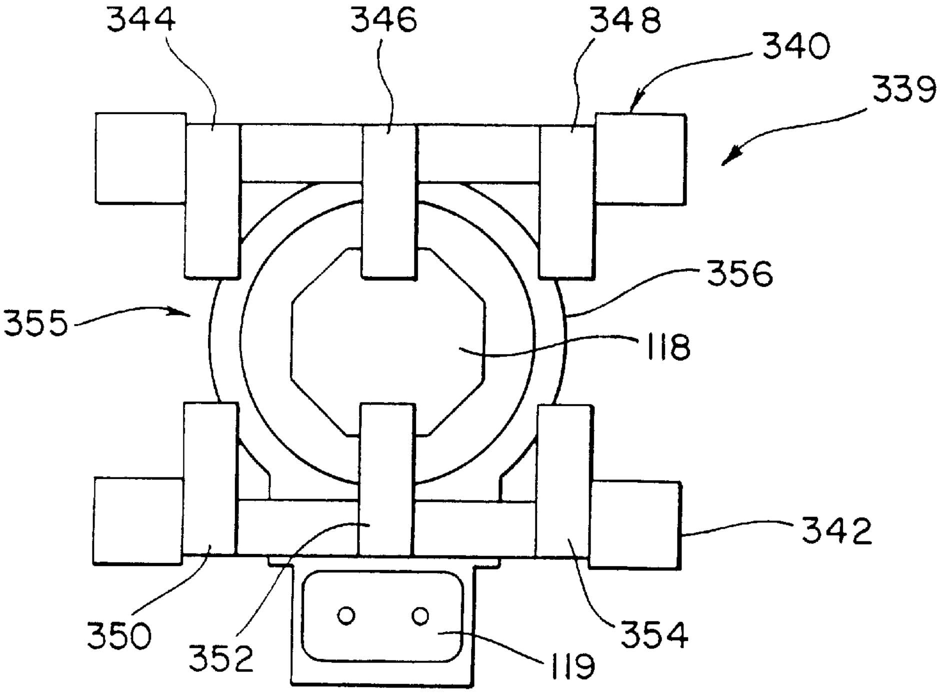
FIG. 17 is a top plan view of a finger guard according to a further embodiment of the present invention.

A finger guard 318 according to another embodiment of the present invention is shown in FIGS. 15 and 16. Finger guard 318 is made of a plastic, composite or any other suitable material as required by UL773A. Finger guard 318 includes a cylindrical or substantially cylindrical base 320 having a disc-shaped portion 322 and a cylindrical or substantially cylindrical-shaped portion 324. Projection portions 326, 328 and 330 extend from the top of one side of cylindrical portion 324 as indicated. Although not shown in FIG. 15 for illustrative purposes, another set of projection portions 332, 334 and 336 extend upwardly from the top of cylindrical portion 324 and face projection portions 326, 328 and 330 respectively as shown in FIG. 16.

Finger guard 318 is positioned on infrared detector 118 so that infrared detector 118 is received into opening 325 in cylindrical portion 324, and is positioned so that a tab 337 on infrared detector 118 extends through opening 338 in cylindrical portion 324. Accordingly, projection portions 326–336 prevent articulate probe 304 (see FIGS. 10–13) from contacting infrared detector 118 regardless of the angle at which articulate probe 304 attempts to enter opening 325 in cylindrical portion 324. Hence, finger guard 318 also complies with UL773A for infrared detector 118.

Alternatively, the finger guard can be arranged as finger guard 339 which includes a pair of snap-on finger guard portions 340 and 342. As indicated, finger guard portion 340 includes three projection portions 344, 346 and 348, and finger guard portion 342 includes projection portions 350, 352, and 354. Finger guard portions 342 and 344 are removably snap-fit onto infrared detector 118 directly, or onto a sleeve member 355 which has a cylindrically shaped portion 356 that surrounds infrared detector 318 and a rectangular portion 357 that surrounds ambient light detector 119. Finger guard portions 342 and 344, and sleeve member 355 each are made of plastic, composite or any other suitable material as required by UL773A.

Projection portions 344–354 prevent articulate probe 304 (see FIGS. 10–13) from contacting infrared detector 318 regardless of the angle at which articulate probe 304 attempts to contact infrared detector 118. Rectangular portion 357 prevents articulate probe 304 from contacting ambient light detector 119 from any angle. Hence, finger guard 338 also is in full compliance with UL773A for infrared detector 118 and ambient light detector 119.

Alternatively, instead of including projection portions as discussed above, finger guard 320 and sleeve member 355 can include an infrared transmissive insulative window (not shown) made of, for example, high density polyethylene, silicon, germanium, or any other suitable material, which covers infrared detector 118. Hence, the window permits infrared energy to pass to infrared detector 118 while also preventing physical contact with infrared detector 118.

Figure 18:
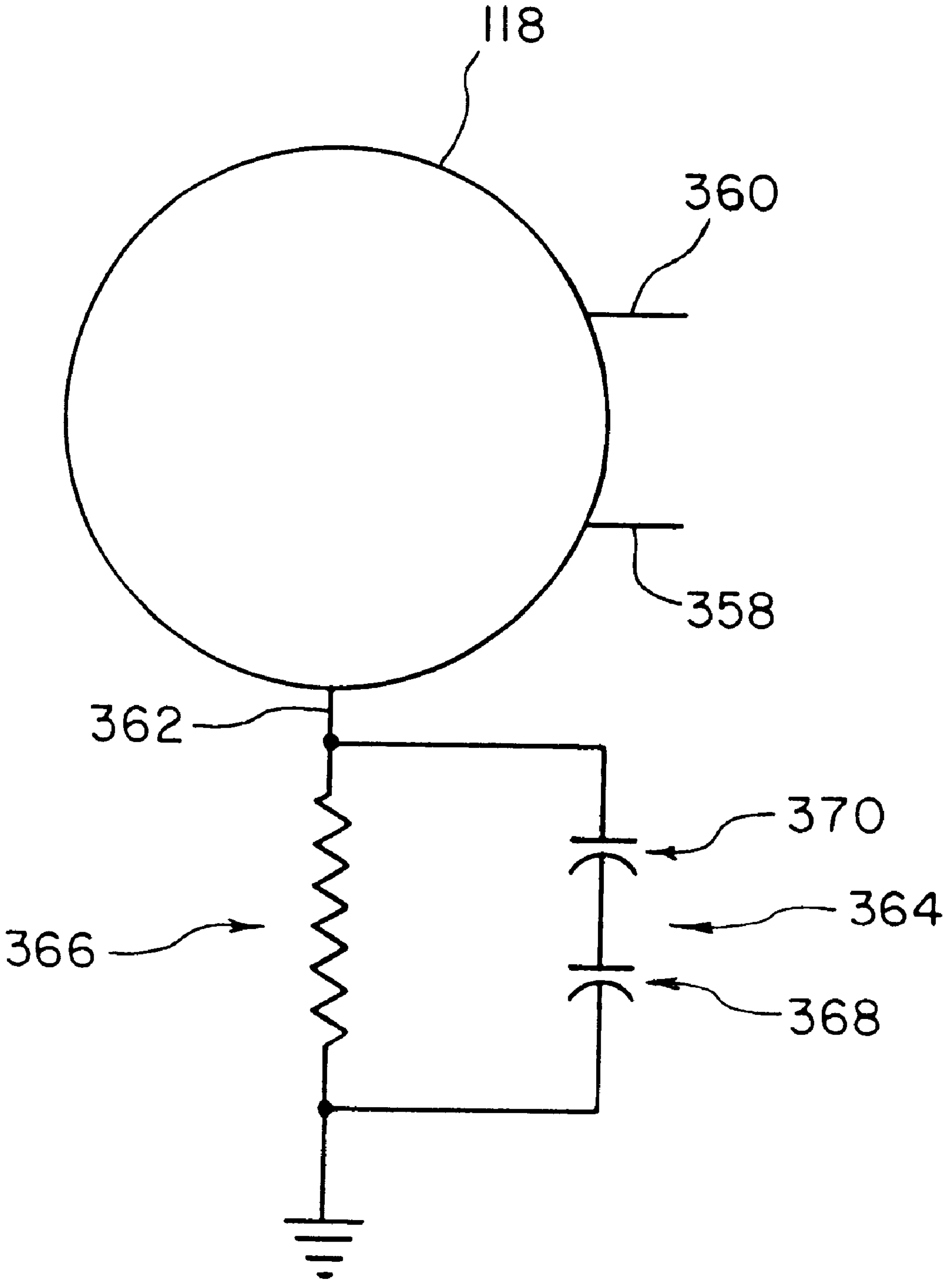
FIG. 18 is an electronic schematic of a circuit according to an embodiment of the present invention for limiting current being provided to an infrared detector in the motion detector device shown in FIGS. 1 and 2.

Instead of providing a mechanical device, such as a finger guard, which prevents contact with infrared detector 118 to prevent the possibility of electrical shock, a current limiting circuit can be coupled to infrared detector 118 to limit the current that infrared detector 118 receives from power supply circuit 110. That is, as shown schematically in FIG. 18, infrared detector 118 includes terminals 358 and 360 which are coupled to circuitry (not shown) and thus receive power from power supply circuit board 110 (see FIG. 1). Infrared detector 118 further includes a terminal 362. A current limiting circuit 364 according to an embodiment of the present invention is coupled to terminal 362 of infrared detector 118 as shown. The current limiting circuit 364 thus gives no optical attenuation to infrared energy or ambient light being received by infrared detector 118.

Current limiting circuit 364 includes a resistor 366 in a plurality of capacitors 368 and 370. In this example, resistor 366 has a resistance value of 820 kΩ, and capacitors 368 and 370 each have a capacitance of 500 pf. One terminal of resistor 366 is connected directly to terminal 362 of infrared detector 118, and the other terminal of resistor 366 is connected to ground. One terminal of capacitor 368 is connected directly to terminal 362 of infrared detector 118, and the other terminal of capacitor 368 is connected to a terminal of capacitor 370. The other terminal of capacitor of 370 is connected to ground as indicated Accordingly, in this example, capacitors 368 and 370 are coupled in series with each other to provide a high frequency noise shunt path, and are coupled in parallel with resister 366 which provides the DC current limited connection. Current limiting circuit 364 operates to limit current being provided to infrared detector 118 to less than about 500 $\mu$A (rms). Current limiting circuit 364 therefore complies with UL773A in that it limits the maximum current that can be provided to an uninsulated electronic component (i.e., infrared detector 118) to less than 500 $\mu$A.

Although current limiting circuit 364 in this example includes one resistor 366 and two capacitors 368 and 370, the circuit can include any number of resistors and capacitors, having any suitable resistance and capacitance values which will limit the maximum current received by infrared detector 118 to less than 500 $\mu$A. Also, it is preferable to use at least two capacitors as shown to provide the desired amount of capacitance, instead of one capacitor having that desired capacitance value. Hence, if one of the capacitors 368 or 370 become short circuited, the other capacitor will provide a sufficient capacitance to limit the maximum current provided to infrared detector 118 to less than 500 $\mu$A. However, if only one capacitor were to be used and that capacitor became shorted, the resistor 366 would be shunted by the shorted capacitor, which would not limit the maximum current being provided to infrared detector 118 to below 500 $\mu$A.

Also, although not shown, a current limiting circuit similar to current limiting circuit 364 can be coupled to ambient light detector 119 to limit the current being provided to ambient light detector 119 to less than 500 $\mu$A.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus, for use with an electronic device, for restricting physical access to a component of said electronic device having an uninsulated external surface adapted to carry a voltage, comprising:

a housing defining a first opening therein, and being adapted to mount to said electronic device such that said first opening permits passage of spectral energy therethrough to said component; and a projection arrangement, extending from said housing and defining a second opening which permits spectral energy passing therethrough to pass through said first opening to said component, said projection arrangement limiting physical access to said surface of said component through said first opening.

2. An apparatus as claimed in claim 1, wherein said projection arrangement comprises:

a first projection portion, extending from said housing in a first direction transverse to a first plane in which said housing defines said first opening; and a second projection portion, extending from said first projection portion along a second plane transverse to said first direction, and having an edge defining at least a portion of a perimeter of said second opening.

3. An apparatus as claimed in claim 2, wherein:

said second projection portion comprises a plurality of projections, each extending substantially along said second plane.

4. An apparatus as claimed in claim 3, wherein:

each of said projections extends along said second plane facing another of said projections.

5. An apparatus as claimed in claim 1, wherein:

said projection arrangement comprises a plurality of projections, each extending from said housing about said first opening in a direction transverse to a plane in which said housing defines said first opening.

6. An apparatus as claimed in claim 5, wherein at least one of said projections in said projection arrangement comprises:

a first projection portion, extending from said housing in an extending direction transverse to a plane in which said housing defines said first opening; and a second projection portion, extending from said first projection portion in a direction transverse to said extending direction, and having an edge defining at least a portion of said perimeter of said second opening.

7. An apparatus as claimed in claim 6, wherein:

each of said projections comprises a said first projection portion and a said second projection portion.

8. An apparatus as claimed in claim 5, wherein:

said projections are disposed at substantially equal intervals about said first opening.

9. An apparatus as claimed in claim 5, wherein:

said projection arrangement comprises four of said projections, spaced at substantially 90° intervals about a central axis of said first opening.

10. An apparatus as claimed in claim 1, wherein:

said housing defines said first opening in a plane; and said projection arrangement permits spectral energy to enter said first opening at angles ranging between an angle normal to said plane to an angle substantially parallel to said plane.

11. An apparatus as claimed in claim 1, wherein:

said housing and projection arrangement comprise a composite material.

12. An apparatus as claimed in claim 1, wherein:

said component is an infrared detector, and said projection arrangement limits physical access to said infrared detector while permitting infrared energy to pass to said infrared detector.

13. An apparatus as claimed in claim 1, wherein:

said electronic device includes a second component having an uninsulated external surface adapted to carry a voltage; and said housing defines a third opening therein which permits passage of light therethrough to said second component, and includes a wall portion, encompassing at least a portion of said third opening, which restricts physical access to said second component through said third opening.

14. An apparatus as claimed in claim 13, wherein:

said second component is an ambient light detector, and said wall portion limits physical access to said ambient light detector through said second opening while permitting ambient light to pass to said ambient light detector through said second opening.

15. An apparatus, for use with an electronic device, for limiting a current being provided to a infrared detector of said electronic device from a circuit of said electronic device, comprising:

a resistive element, adapted to couple a terminal of said infrared detector to ground; and a capacitive element, adapted to couple said terminal of said infrared detector to ground;

said resistor and capacitive element having resistance and capacitance values, respectively, which limit said current to less than about 500 $\mu$A.

16. An apparatus as claimed in claim 15, wherein:

said capacitive element comprises a plurality of capacitors coupled in series.

17. An apparatus as claimed in claim 16, wherein:

each of said capacitors has a capacitance of about 500 pf.

18. An apparatus as claimed in claim 15, wherein:

said resistive element has a value of at least about 820 k$\Omega$.

19. An apparatus as claimed in claim 15, wherein:

said resistive element and said capacitive element are coupled in parallel between said terminal and ground.

20. A method for restricting physical access to a spectral energy detector of an electronic device having an uninsulated external surface adapted to carry a voltage, comprising the steps of:

providing a housing defining a first opening therein and a projection arrangement extending from said housing and defining a second opening therein; and positioning said housing in said electronic device such that said first opening is substantially aligned with said detector, said projection arrangement permitting spectral energy passing through said second opening to pass through said first opening to said detector while limiting physical access to said surface of said component through said first opening.

21. A method for limiting a current being provided to a spectral energy detector of an electronic device from a circuit of said electronic device, comprising the steps of:

coupling a current limiting circuit, comprising a resistive element and a capacitive element coupled in parallel, between a terminal of said spectral energy detector and ground; and operating said current limiting circuit to limit said current to less than about 500 $\mu$A.

* * * * *